US012686210B2

(12) United States Patent
Chida et al.

(10) Patent No.: US 12,686,210 B2
(45) Date of Patent: Jul. 21, 2026

(54) LIQUID EJECTION HEAD AND METHOD OF MANUFACTURING LIQUID EJECTION HEAD

(71) Applicant: CANON KABUSHIKI KAISHA, Tokyo (JP)

(72) Inventors: Mitsuru Chida, Kanagawa (JP); Junichiro Iri, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 58 days.

(21) Appl. No.: 18/588,524

(22) Filed: Feb. 27, 2024

(65) Prior Publication Data

US 2024/0286408 A1 Aug. 29, 2024

(30) Foreign Application Priority Data

Feb. 28, 2023 (JP) ................................ 2023-029210

(51) Int. Cl.
*B41J 2/16* (2006.01)
*B41J 2/14* (2006.01)

(52) U.S. Cl.
CPC . *B41J 2/16* (2013.01); *B41J 2/14* (2013.01); *B41J 2002/14491* (2013.01)

(58) Field of Classification Search
CPC ...... B41J 2/16; B41J 2/14; B41J 2002/14491; B41J 2/1603; B41J 2/1623; B41J 2/14072
See application file for complete search history.

(56) References Cited

U.S. PATENT DOCUMENTS 9,487,004 B2 11/2016 Ishimatsu et al.
9,662,885 B2 * 5/2017 Shimazu ................ B41J 2/1623

FOREIGN PATENT DOCUMENTS

JP 2015-000569 A 1/2015

* cited by examiner

*Primary Examiner* — Lisa Solomon
(74) *Attorney, Agent, or Firm* — Venable LLP

(57) ABSTRACT

A liquid ejection head includes: a housing; an element substrate disposed on a first surface of the housing and including an energy generation element to eject a liquid; a relay wiring member disposed on a second surface at a position protruding in a liquid ejection direction more than the first surface and surrounding the element substrate; a lead connecting the element substrate with the relay wiring member; a filling portion provided between the housing and a side surface of the element substrate; a connection portion surrounded between the housing and the element substrate, connected with the filling portion, and adjacent to the lead; and a sealant sealing the filling portion, the connection portion, and the lead, in which a distance between the housing and the element substrate is smaller in a portion adjacent to the second surface than in a portion between the first surface and the second surface.

8 Claims, 7 Drawing Sheets

LIQUID EJECTION HEAD AND METHOD OF MANUFACTURING LIQUID EJECTION HEAD

BACKGROUND

Field of the Disclosure

The present disclosure relates to a liquid ejection head and a method of manufacturing the liquid ejection head.

Description of the Related Art

Usually, a liquid ejection head of a liquid printing apparatus that ejects a liquid for printing and the like on a printing medium includes an element substrate from which the liquid is ejected and a housing that supplies the liquid, and the element substrate is operated by transmitting an electric signal to the liquid ejection head to attach a liquid droplet onto the printing medium.

In order to transmit the electric signal from the liquid printing apparatus to the element substrate through a relay wiring member of the liquid ejection head, a lead is provided between the element substrate and the relay wiring member, and the relay wiring member is electrically connected with the element substrate through the lead.

There has been disclosed in Japanese Patent Laid-Open No. 2015-000569 (hereinafter, PTL 1) a method of protecting the lead by using a sealant to protect the lead from wire break due to corrosion caused by liquid and force acting from outside. PTL 1 discloses a method of protecting the lead by applying the sealant from the side of the element substrate to flow into the lead and thermally curing the sealant.

However, along with an increase in the printing speed and improvement of accuracy, it is noticeable in recent liquid ejection heads that the size of the liquid ejection head has been increased. That is, the sizes of the housing and the lead are increased, and a flow channel to flow the sealant into the lead is increased in length. Additionally, in order to protect the lead increased in size, an amount of the applied sealant is increased, and the inner volume of a portion of the housing to which the sealant is applied is increased; therefore, the time required to flow the protection member into the lead in the housing is also increased. Moreover, it has been difficult to apply the sealant from the side of the element substrate to flow into the lead and completely fill in the lead.

SUMMARY

The present disclosure includes: a housing; an element substrate that is disposed on a first surface of the housing and includes an energy generation element to eject a liquid; a relay wiring member that is disposed on a second surface at a position protruding in a liquid ejection direction more than the first surface of the housing and that surrounds the element substrate; a lead that electrically connects the element substrate with the relay wiring member; a filling portion that is provided between the housing and a side surface of the element substrate in a planar view from the liquid ejection direction; a connection portion that is surrounded between the housing and the element substrate, connected with the filling portion, and adjacent to the lead; and a sealant that seals the filling portion, the connection portion, and the lead, in which a distance between the housing and the element substrate in a direction parallel to the first surface in the connection portion is smaller in a portion adjacent to the second surface than in a portion between the first surface and the second surface.

Further features of the present disclosure will become apparent from the following description of exemplary embodiments with reference to the attached drawings.

DESCRIPTION OF THE EMBODIMENTS

Embodiments of the present disclosure are described in detail with reference to the drawings. Note that, a dimension, material, a shape, and relative arrangement of each constituent of the embodiments described below may be changed as needed depending on a configuration of a liquid ejection head to which the present disclosure is applied and various conditions. The scope of the present disclosure is not limited to the embodiments described below.

Embodiment

Figure 1A:
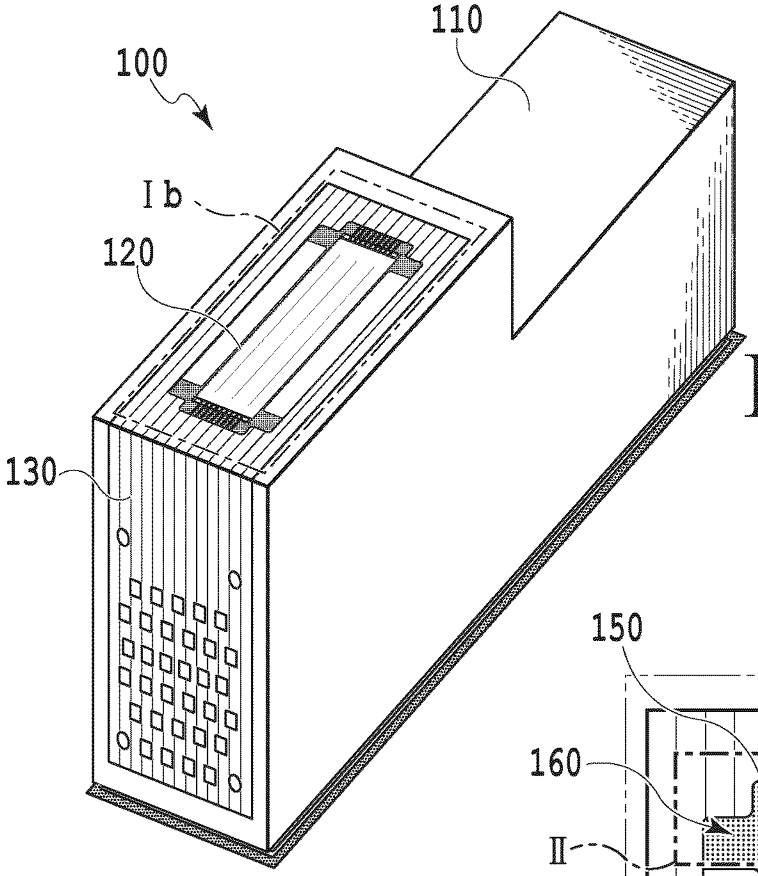
FIG. 1A is a conceptual view illustrating a liquid ejection head.
Figure 1B:
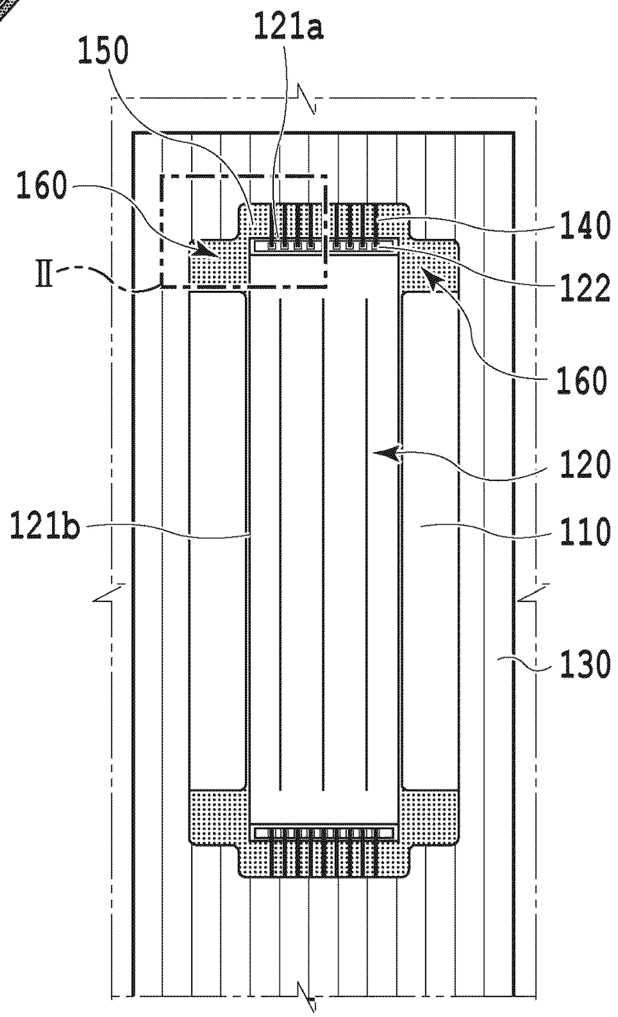
FIG. 1B is an enlarged view illustrating a Ib portion of the liquid ejection head illustrated in FIG. 1A.

FIG. 1A is a conceptual view illustrating a liquid ejection head according to an embodiment, and FIG. 1B is an enlarged view illustrating a Ib portion of the liquid ejection head illustrated in FIG. 1A. As illustrated in FIGS. 1A and 1B, a liquid ejection head 100, which is applied to a liquid printing apparatus that ejects a liquid for printing and the like on a printing medium, includes a housing 110, an element substrate 120, a relay wiring member 130, and a lead 140.

The housing 110 is a liquid supply portion that supplies a pressure chamber of the element substrate 120 (described later) with the liquid, and the relay wiring member 130 and the element substrate 120 are disposed on a surface of the housing 110. The housing 110 may be formed by insert molding and the like using a mold. The housing 110 is formed of a material having resistance to the supplied liquid. For example, the housing 110 may be made of resin such as modified PPE (polyphenylene ether), PS (polystyrene), HIPS (high impact polystyrene), or PET (polyethylene terephthalate).

The relay wiring member 130 is a member that electrically connects the element substrate 120 through the lead 140 and is a member that transmits a signal to drive an energy generation element (described later) included in the element substrate 120. The relay wiring member 130 may be a flexible wiring portion, and a flexible printed substrate (FPC) may be used, for example. Additionally, before the element substrate 120 is bonded to the housing 110, the relay wiring member 130 may be electrically connected to an electric connection portion 122 of the element substrate 120 through the lead 140. In the embodiment, the electric connection portion 122 of the element substrate 120 is an electric wiring pad.

The lead 140 electrically connects the relay wiring member 130 to the element substrate 120. For example, the lead 140 may be formed by exposing copper foil wiring plated with nickel and gold from under a base film of the relay wiring member 130. Additionally, the plated metal around the copper foil wiring may not be limited to gold and may be silver, chromium, tin, copper, or the like. Moreover, the lead 140 may be connected with the relay wiring member 130 by an Inner Lead Bonding (ILB) method while being exposed from the base film of the relay wiring member 130. That is, one end of the lead 140 is formed integrally with the relay wiring member 130, and the other end of the lead 140 may be connected with the electric connection portion 122 of the element substrate 120.

In the embodiment, the electric connection portion 122 of the element substrate 120 connected with the lead 140 is disposed on a short side 121*a* of the element substrate 120.

In order to connect the lead 140 with the electric connection portion 122 of the element substrate 120, for example, a bonding tool heated to 400° C. is used to push the lead 140 while applying a load of about 30 N. Thus, the lead 140 is in metal diffusion bonding with the electric connection portion 122 of the element substrate 120. As another connection method, without heating the bonding tool, an ultrasonic wave is applied through the bonding tool to make the metal bonding between the lead 140 and the electric connection portion 122 of the element substrate 120.

In order to eject the liquid such as ink, the element substrate 120 includes multiple ejection ports from which the liquid is ejected, multiple pressure chambers communicating with each ejection port, and the energy generation element that is contained in each pressure chamber and generates ejection energy.

In a method of manufacturing the element substrate 120, a silicon wafer may be used for the element substrate. The silicon wafer is in the form of a circular plate having a great area, and it is possible to cut out many element substrates 120 from one silicon wafer. Specifically, the energy generation element and a wiring layer are formed in multiple portions of the silicon wafer having a thickness of 0.725 mm, and thus a heat accumulation layer and a protection film are formed.

Next, a flow channel mold member is applied to the silicon wafer to cover each element substrate 120 of the silicon wafer, and additionally, the flow channel mold member is patterned by using a photolithography technique to form the pressure chamber of the element substrate 120. To be specific, in order to cover the silicon wafer with the flow channel mold member after the patterning, an ejection port forming member is laminated on the silicon wafer and patterned by using the photolithography technique. Additionally, a protection member that covers and protects the flow channel mold member and the ejection port forming member is provided on the silicon wafer.

Moreover, a leading hole is formed by emitting laser light (for example, YAG fundamental wave) from the opposite side of a surface of the silicon wafer on which a layer such as the ejection port forming member is formed. The leading hole is to be a starting point to form a liquid flow channel. As an example, the leading hole has a diameter of 0.05 mm and a depth of 0.7 mm.

Subsequently, anisotropic etching is performed to eat away a portion around the leading hole in the silicon wafer and completely remove a sacrificial layer. In the anisotropic etching, for example, it is possible to use a solution of TMAH22%, which has an etching rate for silicon of a plane orientation of <100> plane that is 0.5 μm/min, as an etchant. Then, anisotropic wet etching is performed by dipping in the etchant at a temperature of 83° C. for 100 minutes to remove the heat accumulation layer and the protection film, and the liquid flow channel is formed.

Thereafter, the flow channel mold member is removed, and a flow channel of the liquid that communicates from a liquid flow channel on a surface of the silicon wafer on the opposite side of an ejection port forming member side to a surface on the ejection port forming member side is formed. Then, the silicon wafer is arranged in a curing oven to heat at 200° C. for 60 minutes, and the ejection port forming member is completely cured. On the silicon wafer, many individual element substrates 120 forming the above-described liquid path are formed. Next, the silicon wafer fixed to a dicing tape is cut at a scribe line by using a dicing device. Thus, the element substrate 120 is obtained.

On the other hand, in the housing 110, a liquid supply unit bonded to the element substrate 120 and communicating with the element substrate 120 is formed to supply the pressure chamber of the element substrate 120 with the liquid.

In a case of being disposed in the liquid printing apparatus, the liquid ejection head 100 may operate the energy generation element of the element substrate 120 by transmitting the electric signal to the element substrate 120 from the liquid printing apparatus through the relay wiring member 130 and the lead 140 and can attach a liquid droplet onto the printing medium.

Figure 2:
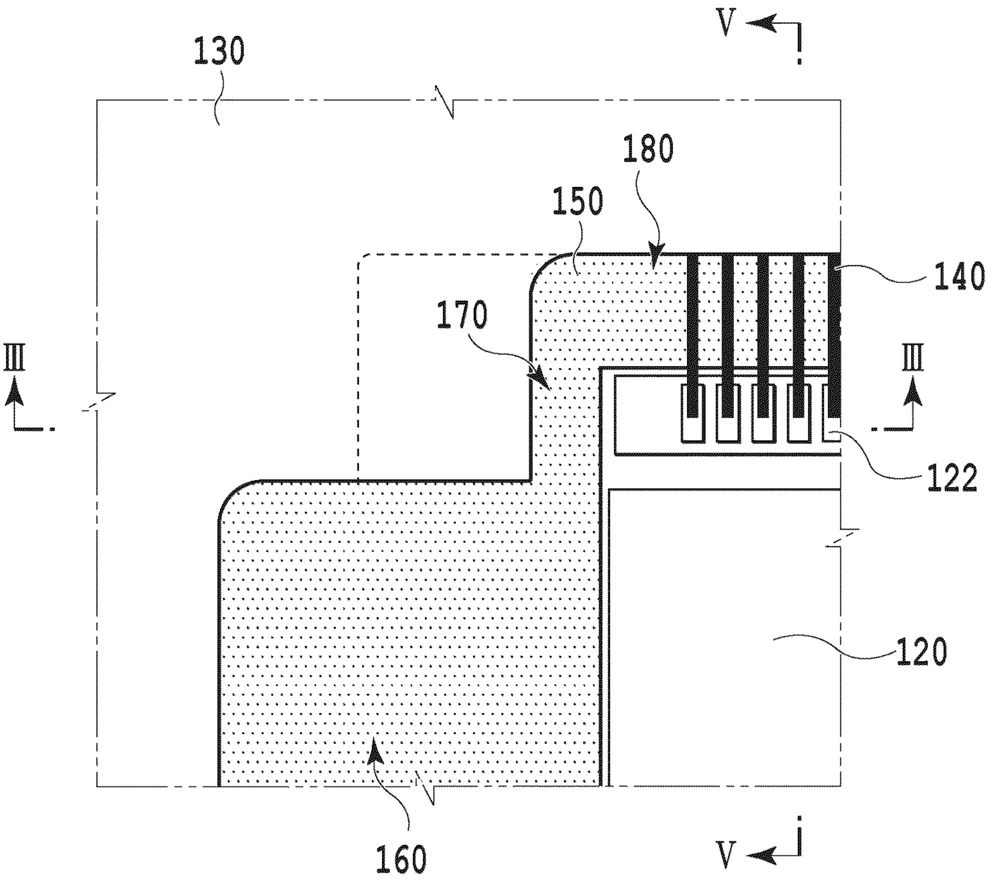
FIG. 2 is an enlarged view illustrating a II portion of the liquid ejection head illustrated in FIG. 1B.
Figure 3:
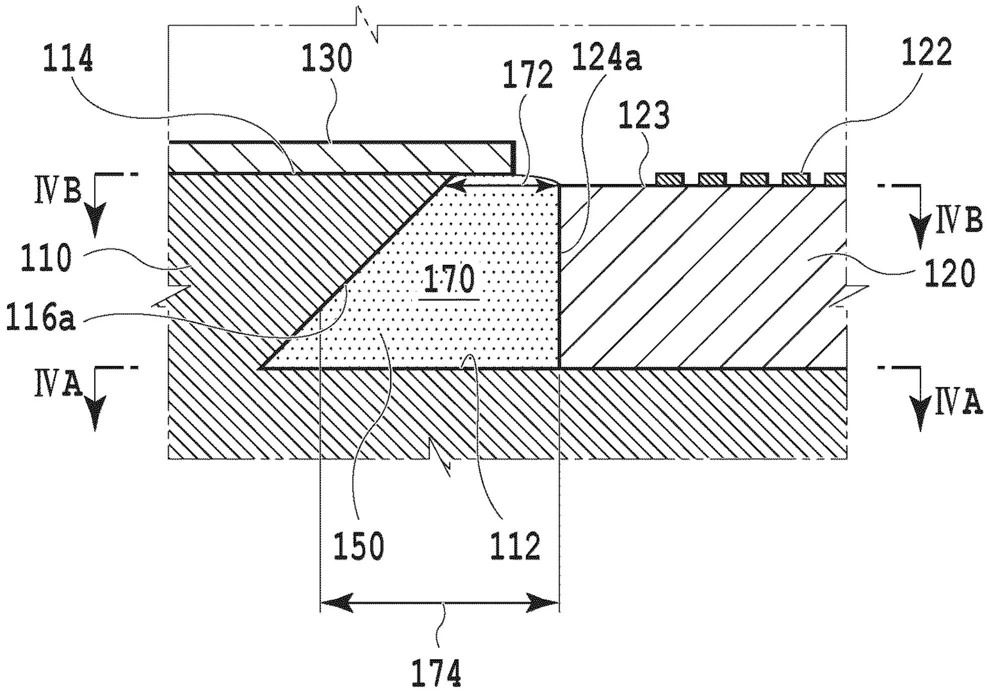
FIG. 3 is a cross-sectional view taken along a III-III line in FIG. 2.

FIG. 2 is an enlarged view illustrating a II portion of the liquid ejection head 100 illustrated in FIG. 1B, and FIG. 3 is a cross-sectional view taken along a III-III line in FIG. 2. As illustrated in FIGS. 2 and 3, the liquid ejection head 100 includes a sealant 150 to protect the lead 140. The sealant 150 is formed between a filling portion 160 provided in the housing 110 and the housing 110 and the element substrate 120. The sealant 150 seals the lead 140 and a connection portion 170, which is connected with the filling portion 160 and adjacent to the lead 140. That is, the connection portion 170 is surrounded by the housing 110 and the element substrate 120. To be specific, in the housing 110, a flow-in portion 180 is provided below the lead 140, and it is possible to seal the lead 140 with the sealant 150 flowing into the flow-in portion 180 from the filling portion 160 through the connection portion 170 and filling the flow-in portion 180. Additionally, in the embodiment, with the filling in the flow-in portion 180, the sealant 150 may seal the electric connection portion 122 connected with the lead 140 of the element substrate 120.

In the embodiment, as an example, a thermosetting type insulation protection member having fluidity is used as the sealant 150. To be more specific, thermosetting type epoxy resin with low viscosity (for example, 10 Pa·s or smaller) is used as the sealant 150. However, the sealant 150 is not limited to the thermosetting type epoxy resin, and it is possible to appropriately select arbitrary composition, curing method, and viscosity.

As illustrated in FIG. 3, the element substrate 120 is disposed on a first surface 112 of the housing 110, and the relay wiring member 130 is disposed on a second surface 114 at a position protruding in a liquid ejection direction more than the first surface 112 of the housing 110. Additionally, the relay wiring member 130 surrounds the element substrate 120 (see FIG. 1).

Figure 4A:
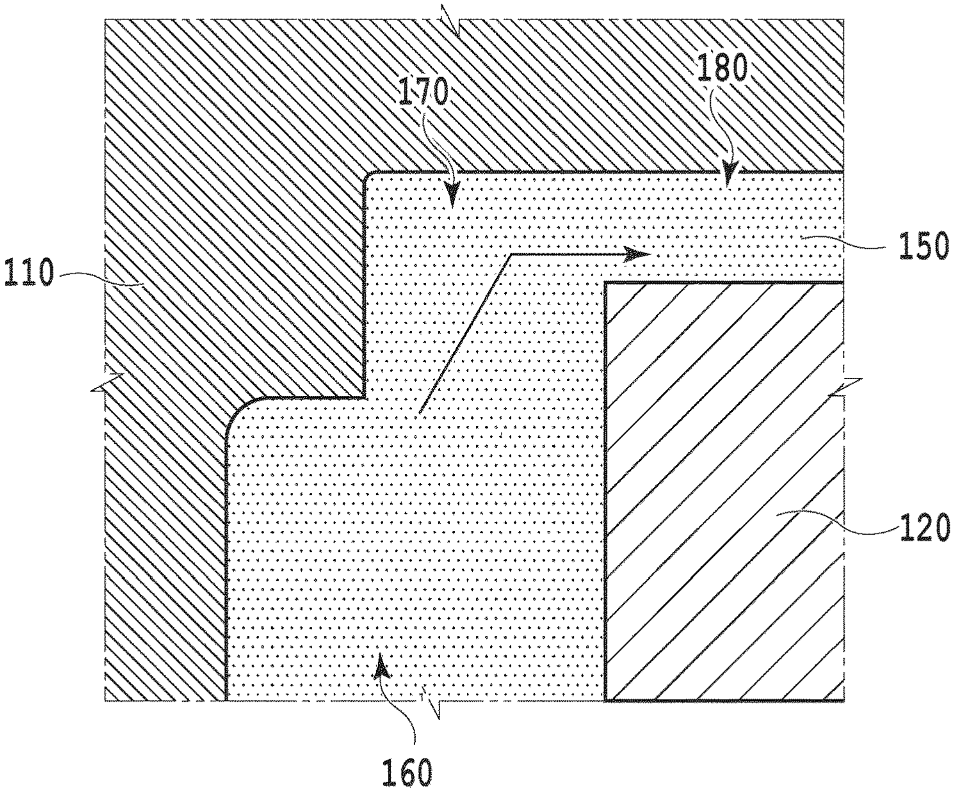
FIG. 4A is a cross-sectional view taken along a IVA-IVA line in FIG. 3.
Figure 4B:
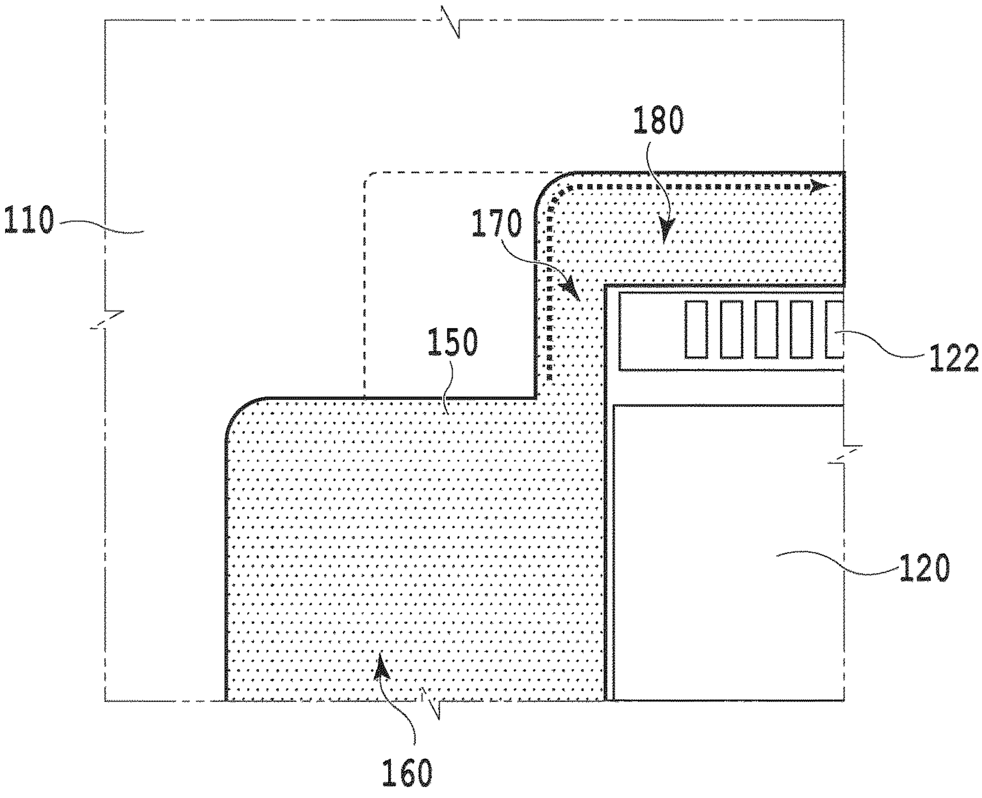
FIG. 4B is a cross-sectional view taken along a IVB-IVB line in FIG. 3.

FIG. 4A is a cross-sectional view taken along a IVA-IVA line in FIG. 3, and FIG. 4B is a cross-sectional view taken along a IVB-IVB line in FIG. 3. As illustrated in FIGS. 3, 4A, and 4B, the connection portion 170 includes a transmission path and an inlet port formed below the transmission path. The transmission path is a portion adjacent to the second surface 114 of the housing 110, the inlet port is a portion between the first surface 112 and the second surface 114, and a distance 172 of the transmission path in a horizontal direction parallel to the first surface 112 is smaller than a distance 174 of the inlet port in the horizontal direction. Additionally, the transmission path is closer to the second surface 114 of the housing 110 than the inlet port. That is, in the connection portion 170, a distance between the housing 110 and the element substrate 120 in the horizontal direction is smaller in the portion adjacent to the second surface 114 than that in the portion between the first surface 112 and the second surface 114.

To be specific, in the connection portion 170, the housing 110 includes a first side surface 116*a* connected with the first surface 112 and the second surface 114, and in the embodiment, the first side surface 116*a* may be an inclined surface. Additionally, in the connection portion 170, the element substrate 120 includes a second side surface 124*a* connected with the first surface 112 of the housing 110 and a surface 123 on which the electric connection portion 122 of the element substrate 120 is disposed. That is, the first side surface 116*a* and the second side surface 124*a* form the connection portion 170.

Additionally, in a case where the second surface 114 of the housing 110 is higher than the surface 123 of the element substrate 120, the distance 172 of the transmission path in the horizontal direction is a distance from an end portion of the second side surface 124*a* that is connected with the surface 123 to the first side surface 116*a* of the housing 110 in the horizontal direction.

Since the transmission path of the connection portion 170 includes a wide liquid flow-in portion (see FIG. 4A), the sealant 150 easily flows into the lead 140 and the electric connection portion 122 of the element substrate 120. Additionally, since the distance 172 of the inlet port of the connection portion 170 in the horizontal direction is small, the distance in which the sealant 150 flows into the lead 140 from the connection portion 170 is short (see FIG. 4B). Thus, it is possible to reliably spread the sealant 150 into the lead 140 and to seal the lead 140.

In the embodiment, the filling portion 160 and the connection portion 170 are adjacent to two long sides 121*b* of the element substrate 120 and are disposed on two sides of a short side 121*a* of the element substrate 120 (see FIG. 1). Therefore, the sealant 150 flows into the flow-in portion 180 disposed below the lead 140 from the two sides of the short side 121*a* of the element substrate 120 concurrently, and thus the sealant 150 can seal the lead 140 quickly. As a result, the sealant 150 can efficiently cover a base of the lead 140.

In the embodiment illustrated in FIG. 3, in the connection portion 170, the distance 174 of the portion between the first surface 112 and the second surface 114 in the horizontal direction may be twice or more times wider than the distance 172 of the portion adjacent to the second surface 114 of the housing 110 in the horizontal direction. Additionally, the connection portion 170 may be formed by a method of shaving the housing 110 by an end mill or the like, or the connection portion 170 may be formed by a method in which a portion forming the first surface 112 of the housing 110 and a portion forming the second surface 114 of the housing 110 are formed by other processing, and the above-described two portions are adhered to each other.

In the embodiment, the relay wiring member 130 is attached to the second surface 114 of the housing 110 with an adhesive, and the element substrate 120 is attached to the first surface 112 of the housing 110 with an adhesive.

To be specific, in the method of manufacturing the liquid ejection head 100 illustrated in FIGS. 1 to 3, an adhesive is applied to surround a liquid supply channel of the second surface 114 of the housing 110 and the first surface 112 of the housing 110. Next, the element substrate 120 is overlapped on the housing 110 by using an adsorption collet, and the element substrate 120 and the relay wiring member 130 are pressed to the housing 110 and are bonded to each other with the adhesive. Then, heating is performed in the curing oven heated to 105° C. for 1.5 hours or more to completely cure the adhesive, and the adhering of the element substrate 120 and the relay wiring member 130 to the housing 110 is completed such that the housing 110 can be in liquid communication with the element substrate 120.

Subsequently, a contact pad side of the relay wiring member 130 that is put in contact with an electric output terminal of the liquid printing apparatus is bent so as to fit along the housing 110. Then, a hole of the relay wiring member 130 is aligned with a swaging pin protruding from the housing 110 to insert the swaging pin. Next, the swaging pin is squashed by a horn heated to 200° C. and bonded with thermocompression, and the contact pad side of the relay wiring member 130 is fixed to the housing 110. Then, an absorber into which the liquid such as ink is absorbed is inserted into the housing 110, and next, a desired liquid is filled, and at last a lid of the housing 110 is welded by generating frictional heat by a lateral vibration welding method to completely seal inside of the housing 110; thus, the liquid ejection head 100 is completed.

On the other hand, as illustrated in FIGS. 1 and 2, the filling portion 160 is provided between the housing 110 and a side surface of the element substrate 120 in a planar view from the liquid ejection direction and is adjacent to four corners of the element substrate 120, the connection portion 170 is connected with the filling portion 160, and the filling portion 160 is adjacent to the long side 121*b* of the element substrate.

The sealant 150 is filled into the filling portion from a position higher than the relay wiring member 130 by an application syringe/needle, flows into the flow-in portion 180 through the connection portion 170, and is applied to the lead 140 and the electric connection portion 122 of the element substrate 120. Thus, the sealant 150 may seal the lead 140 and the electric connection portion 122 of the element substrate.

Figure 5:
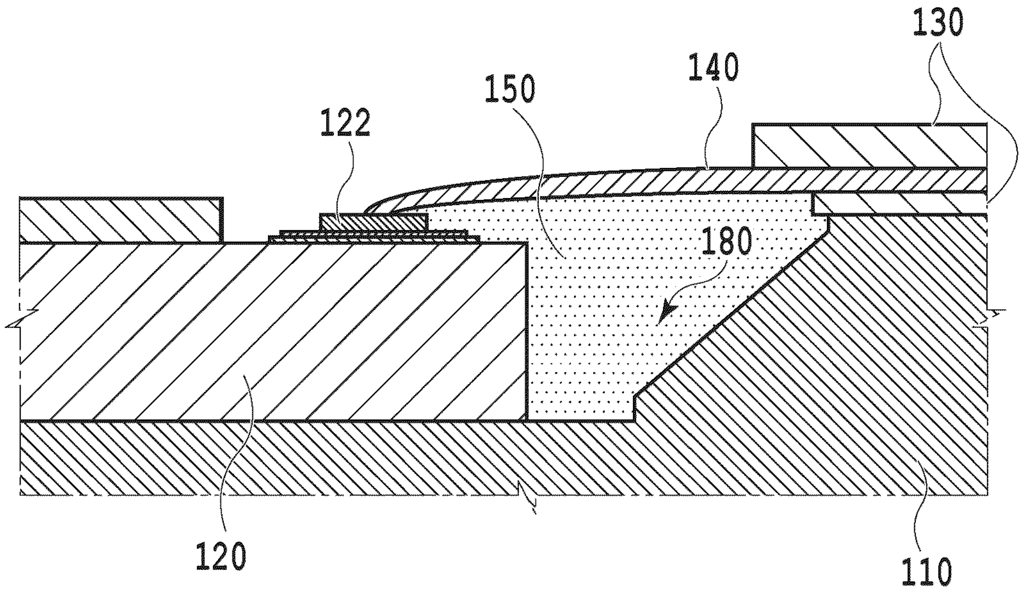
FIG. 5 is a cross-sectional view taken along a V-V line in FIG. 2 illustrating the II portion of the liquid ejection head according to the embodiment.

FIG. 5 is a cross-sectional view taken along a V-V line in FIG. 2 illustrating the II portion of the liquid ejection head 100 according to the embodiment. As illustrated in FIG. 5, with the sealant 150 sealing the filling portion 160, the connection portion 170, the flow-in portion 180, and the lead 140, it is possible to protect lower portions of the relay wiring member 130, the lead 140, and the electric connection portion 122 of the element substrate 120. That is, the sealant 150 can completely cover the base of the lead 140. Additionally, in the embodiment, the sealant 150 of low viscosity may be applied over the lead 140 and the electric connection portion 122 of the element substrate 120, and the lead 140 and the electric connection portion 122 of the element substrate 120 may be sealed by the sealant 150 from the top and bottom.

Figure 6:
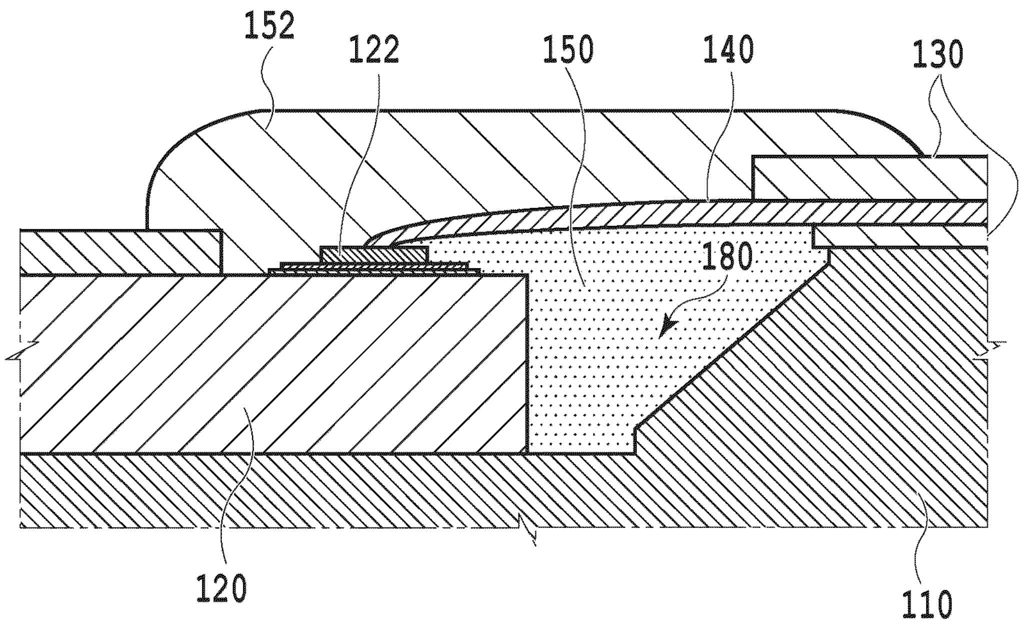
FIG. 6 is a cross-sectional view taken along the V-V line in FIG. 2 illustrating the II portion of the liquid ejection head according to another embodiment.

FIG. 6 is a cross-sectional view taken along a V-V line in FIG. 2 illustrating the II portion of the liquid ejection head according to another embodiment. As illustrated in FIG. 6, in the embodiment, as an example, a thermosetting type insulation protection member with higher viscosity (for example, 200 Pa·s or more) than that of the sealant 150 is applied as a sealant 152 over the lead 140. In the embodiment, thermosetting type epoxy resin with viscosity of 200 Pa·s or more is used as the sealant 152. It is possible to seal the lead 140 from the top and bottom by the sealant 150 and the sealant 152, and the durability is improved. However, the sealant 152 is not limited to the thermosetting type epoxy resin, and it is possible to appropriately select arbitrary composition, curing method, and viscosity.

The embodiments illustrated in FIGS. 7A to 7F illustrate alternative examples similar to the embodiment illustrated in FIG. 3.

Figure 7A:
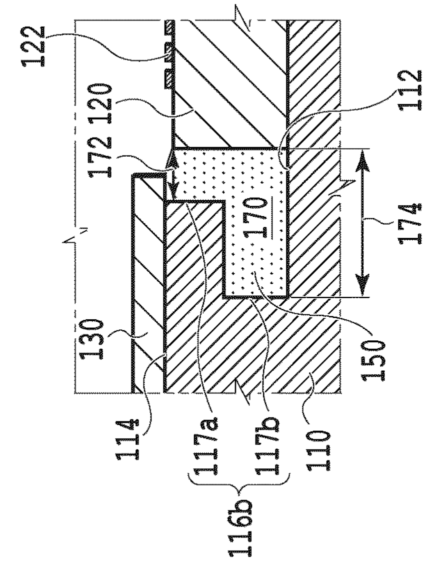
FIG. 7A is a conceptual view illustrating a connection portion of the liquid ejection head.

In the embodiment illustrated in FIG. 7A, in the connection portion 170, the housing 110 includes a first side surface 116*b*. The first side surface 116*b* includes a first portion 117*a* connected with the second surface 114 and a second portion 117*b* connected with the first surface 112. That is, the first portion 117*a* is adjacent closer to the second surface 114 than the second portion 117*b* is. A distance 172*a* between the first portion 117*a* of the first side surface 116*b* and the element substrate 120 in the horizontal direction is smaller than a distance 174*a* between the second portion 117*b* of the first side surface 116*b* and the element substrate 120 in the horizontal direction.

Figure 7B:
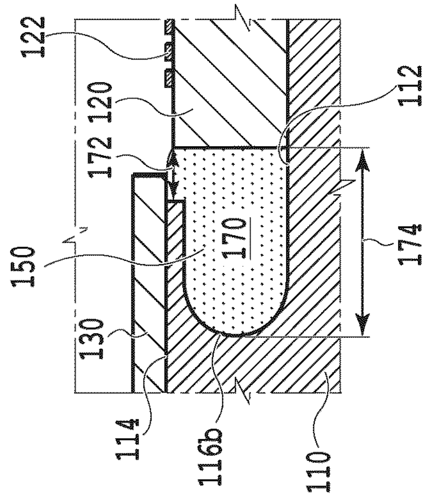
FIG. 7B is a conceptual view illustrating the connection portion of the liquid ejection head.

In the embodiment illustrated in FIG. 7B, in the connection portion 170, the housing 110 includes the first side surface 116*b* connected with the first surface 112 and the second surface 114. The first side surface 116*b* has a curved surface including a recess portion horizontally recessed in a direction away from the element substrate 120. Thus, in the connection portion 170, the distance 172 of a portion adjacent to the second surface 114 in the horizontal direction is smaller than the distance 174 of a portion between the first surface 112 and the second surface 114 in the horizontal direction.

Figure 7C:
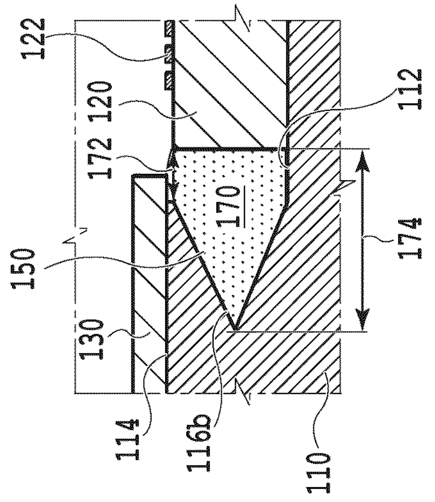
FIG. 7C is a conceptual view illustrating the connection portion of the liquid ejection head.

In the embodiment illustrated in FIG. 7C, in the connection portion 170, the housing 110 includes the first side surface 116*b* connected with the first surface 112 and the second surface 114. The first side surface 116*b* includes a recess portion horizontally recessed in the direction away from the element substrate 120. Thus, in the connection portion 170, the distance 172 of a portion adjacent to the second surface 114 in the horizontal direction is smaller than the distance 174 of a portion between the first surface 112 and second surface 114 in the horizontal direction.

Figure 7D:
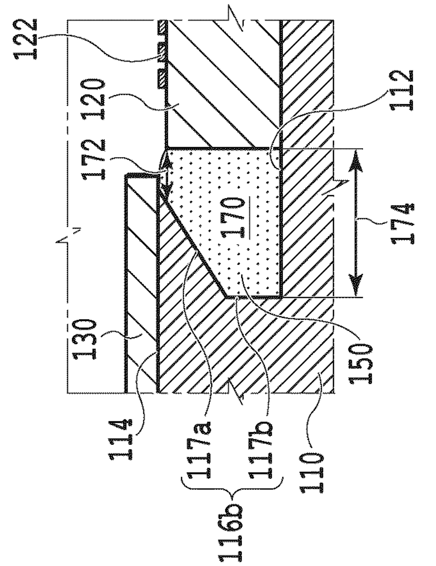
FIG. 7D is a conceptual view illustrating the connection portion of the liquid ejection head.

In the embodiment illustrated in FIG. 7D, the housing 110 includes the first side surface 116*b* in the connection portion 170. The first side surface 116*b* includes the first portion 117*a* connected with the second surface 114 and the second portion 117*b* connected with the first surface 112. The distance 172 between the first portion 117*a* of the first side surface 116*b* and the element substrate 120 in the horizontal direction is smaller than the distance 174 between the second portion 117*b* of the first side surface 116*b* and the element substrate 120 in the horizontal direction. Additionally, the first portion 117*a* is an inclined surface.

Figure 7E:
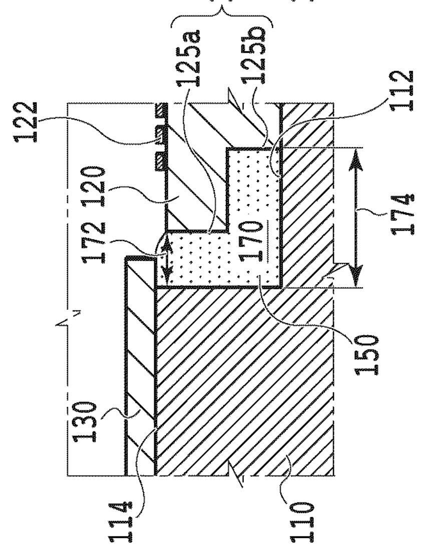
FIG. 7E is a conceptual view illustrating the connection portion of the liquid ejection head.

In the embodiment illustrated in FIG. 7E, in the connection portion 170, the element substrate 120 includes the second side surface 124*a*. The second side surface 124*a* includes a third portion 125*a* adjacent to the second surface 114 and a fourth portion 125*b* connected with the first surface 112. The distance 172 between the third portion 125*a* and the housing 110 in the horizontal direction is smaller than the distance 174 between the fourth portion 125*b* and the housing 110 in the horizontal direction. To be specific, in a process of forming the liquid flow channel in the element substrate 120, the fourth portion 125*b* may be formed with the combination of the leading hole and the anisotropic etching.

Figure 7F:
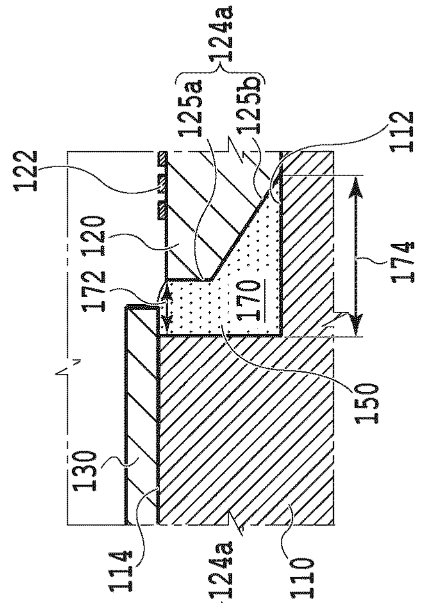
FIG. 7F is a conceptual view illustrating the connection portion of the liquid ejection head.

In the embodiment illustrated in FIG. 7F, in the connection portion 170, the element substrate 120 includes the second side surface 124*a*. The second side surface 124*a* includes the third portion 125*a* adjacent to the second surface 114 and the fourth portion 125*b* connected with the first surface 112. The distance 172 between the third portion 125*a* and the housing 110 in the horizontal direction is smaller than the distance 174 between the fourth portion 125*b* and the housing 110 in the horizontal direction. The fourth portion 125*b* of the second side surface 124*a* is an inclined surface facing the housing 110 in the connection portion 170. To be specific, in a process of forming the liquid flow channel in the element substrate 120, the fourth portion 125*b* that is the inclined surface may be formed with the combination of the leading hole and the anisotropic etching.

In the embodiments illustrated in FIG. 7A to 7F, since a liquid flow-in portion having a wide portion between the first surface 112 and second surface 114 is included in the connection portion 170, the sealant 150 easily flows into the lead 140 and the electric connection portion 122 of the element substrate 120. Additionally, since the distance 172 in the portion adjacent to the second surface 114 of the housing 110 in the connection portion 170 in the horizontal direction is small, and a distance of the connection portion 170 to the lead 140 is short, the sealant 150 is reliably spread into the lead 140. Therefore, the sealant 150 can seal the lead 140 and the electric connection portion 122 of the element substrate 120.

In another embodiment, the liquid ejection head 100 may be formed by disposing together the housing 110 according to an embodiment illustrated in one of FIGS. 3 and FIGS. 7A to 7D and the element substrate 120 according to an embodiment illustrated in one of FIGS. 7E to 7F.

According to the disclosure, it is possible to efficiently and reliably flow the sealant 150 that protects the lead 140 into the lead 140. Even in a case where the element substrate 120 is increased in length according to an increase in size of the liquid ejection head 100, it is adaptable with the minimum change in the housing 110 itself. Additionally, it is possible to provide the liquid ejection head 100 that suppresses investment such as manufacturing equipment for the adapting and the like and that is adapted for performance improvement while keeping the cost low without changing the process and material.

Particularly, in a case where the increase in length of the element substrate advances in such a way that a long side of the element substrate exceeds 1.0 inch, the number of ink ejection nozzles is increased, and a wiring circuit in the element substrate extends. Therefore, a distance on a side of a short side of the element substrate in the horizontal direction for receiving the electric signal through the lead is increased, and thus it is difficult to spread the sealant. According to the embodiment, it is also possible with the liquid ejection head 100 in which the increase in length advances to efficiently and reliably flow the sealant 150 that protects the lead 140 into the lead 140.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-029210, filed Feb. 28, 2023, which is hereby incorporated by reference herein in its entirety.

What is claimed is:

1. A liquid ejection head, comprising:

a housing;

an element substrate that is disposed on a first surface of the housing and comprises an energy generation element to eject a liquid;

a relay wiring member that is disposed on a second surface at a position protruding in a liquid ejection direction more than the first surface of the housing and that surrounds the element substrate;

a lead that electrically connects the element substrate with the relay wiring member;

a filling portion that is provided between the housing and a side surface of the element substrate in a planar view from the liquid ejection direction;

a connection portion that is surrounded between the housing and the element substrate, connected with the filling portion, and adjacent to the lead; and a sealant that seals the filling portion, the connection portion, and the lead, wherein a distance between the housing and the element substrate in a direction parallel to the first surface in the connection portion is shorter in a portion adjacent to the second surface than in a portion between the first surface and the second surface, and in the connection portion, the housing comprises an inclined surface connected with the first surface and the second surface.

2. The liquid ejection head according to claim 1, wherein the element substrate comprises an electric connection portion electrically connected with the lead, and the sealant seals the electric connection portion.

3. The liquid ejection head according to claim 1, wherein the distance between the housing and the element substrate in the direction parallel to the first surface in the connection portion becomes shorter from a portion adjacent to the first surface toward a portion adjacent to the second surface.

4. A liquid ejection head, comprising:

a housing;

an element substrate that is disposed on a first surface of the housing and comprises an energy generation element to eject a liquid;

a relay wiring member that is disposed on a second surface at a position protruding in a liquid ejection direction more than the first surface of the housing and that surrounds the element substrate;

a lead that electrically connects the element substrate with the relay wiring member;

a filling portion that is provided between the housing and a side surface of the element substrate in a planar view from the liquid ejection direction;

a connection portion that is surrounded between the housing and the element substrate, connected with the filling portion, and adjacent to the lead; and a sealant that seals the filling portion, the connection portion, and the lead, wherein a distance between the housing and the element substrate in a direction parallel to the first surface in the connection portion is shorter in a portion adjacent to the second surface than in a portion between the first surface and the second surface, and the element substrate comprises an inclined surface facing the housing in the connection portion.

5. The liquid ejection head according to claim 1, further comprising:

a second sealant that covers the lead.

6. A method of manufacturing a liquid ejection head that comprises:

a housing;

an element substrate that is disposed on a first surface of the housing and comprises an energy generation element to eject a liquid;

a relay wiring member that is disposed on a second surface at a position protruding in a liquid ejection direction more than the first surface of the housing and that surrounds the element substrate;

a lead that electrically connects the element substrate with the relay wiring member;

a filling portion that is provided between the housing and a side surface of the element substrate in a planar view from the liquid ejection direction;

a connection portion that is surrounded between the housing and the element substrate, connected with the filling portion, and adjacent to the lead; and a sealant that seals the filling portion, the connection portion, and the lead, the method comprising:

filling the sealant into the filling portion and applying the sealant to the lead from the filling portion through the connection portion, wherein a distance between the housing and the element substrate in a direction parallel to the first surface in the connection portion is shorter in a portion adjacent to the second surface than in a portion between the first surface and the second surface, and in the connection portion, the housing comprises an inclined surface connected with the first surface and the second surface.

7. The method of manufacturing the liquid ejection head according to claim 6, further comprising:

sealing by applying the sealant to an electric connection portion of the element substrate, the electric connection portion being electrically connected with the lead.

8. The method of manufacturing the liquid ejection head according to claim 6, further comprising:

sealing the lead by applying a second sealant over the lead.

* * * * *